Figures 1, 2:
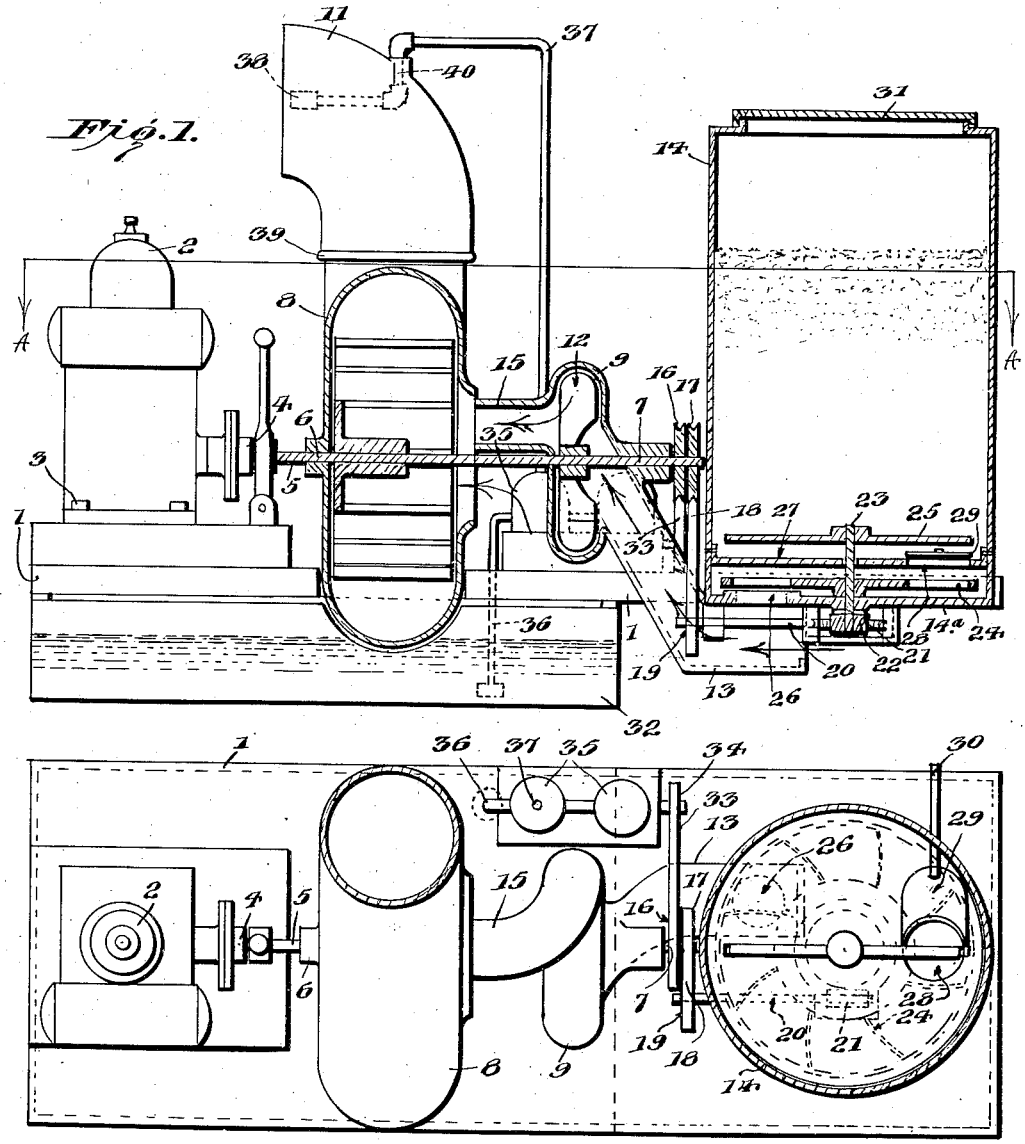

Dec. 23, 1930. A. J. BROWN ET AL 1,785,932
DUSTING AND SPRAYING MACHINE
Filed July 20, 1929

-INVENTORS-
Richard R. Ezdorf.
Arthur J. Brown.

ATTORNEY

Patented Dec. 23, 1930

1,785,932

UNITED STATES PATENT OFFICE

ARTHUR J. BROWN, OF NEW YORK, N. Y., AND RICHARD R. EZDORF, OF WASHINGTON, DISTRICT OF COLUMBIA

DUSTING AND SPRAYING MACHINE

Application filed July 20, 1929. Serial No. 379,795.

This invention relates to agricultural machines and more particularly to such machines used to treat growing crops, fruit trees, vineyards, etc., for the control of insects and diseases which do great harm and injury thereto.

In the scientific and practical treatment of plant life for the control of insects and diseases it is well known that two methods of treatment are commonly resorted to, namely dusting and spraying, and while dusting is considered by many as the more economical method of the two, many conditions exist wherein spraying attains the better or preferable result.

Our invention therefore aims to provide a machine wherewith both dusting and spraying may be done with equal facility.

By a novel arrangement we introduce a liquid such as water, under such pressure as is desired, into a discharging blast of powder impregnated air adjacent the point of discharge. This eliminates the difficulties arising from the transmission of a mixture of liquid carrying poisons or solids through pipes or other means of conveyance.

Novel means for feeding or controlling the discharge of powder from a hopper or container are also provided.

Other novel features will be apparent from the following description together with the accompanying drawings in which:

Figure I is a side elevation partly in section.

Figure II is a section along line A—A of Figure I.

Proceeding in accordance with the drawings 1 is a framework upon which the other elements of the invention are mounted. The whole of the structure being capable of being mounted on a motor truck, farm wagon or the like, or of being mounted upon an axle and pair of wheels, such methods of mounting for transporting forming no part of the invention are accordingly not shown. Upon framework 1, are mounted a gasoline motor 2 as by studs 3 and connected as by clutch 4 to shaft 5 which latter is rotatably mounted in bearing in fan housing 8 and bearing 7 in auxiliary fan housing 9. Upon shaft 5, so as to rotate therewith inside fan housing 8 is rotor 10 for generating a blast of air to be discharged through discharge spout 11 the purposes of which will be more fully described later herein. Likewise rotor 12 is mounted upon shaft 5 to rotate inside of auxiliary fan housing 9 the purpose of which is to create suction, and the passage of air through intake pipe 13, and with the air passing therethrough, solids, powder and the like from container 14, be discharged through pipe 15 into the intake side of fan housing 8.

Upon the end of shaft 5 are mounted grooved pulleys 16 and 17. Pulley 17 transmits power through V belt 18 to grooved pulley 19, which latter is mounted upon shaft 20 which in turn transmits power through worm 21 to worm wheel 22. Worm wheel 22 is mounted upon vertical shaft 23 which has rotatably mounted thereon spider 24 and agitator 25. Container 14 has an opening 26 at its bottom 14ª communicating with intake pipe 13. A partition 27 in container 14 is spaced a short distance above the bottom thus forming a chamber in which spider 24 revolves. Agitator 25 revolves immediately above partition 27 to keep the powder in the container properly agitated. Partition 27 has a port 28 through which powder is fed from container 14 into the chamber below the partition.

The flow of powder through the port 28 is controllably regulated by gate 29 which may be manipulated by lever 30. A suitable removable lid or cover 31 is provided for container 14.

A liquid container 32 is mounted below frame 1, power is transmitted through V belt 33 and pulley 34 to pump 35, the latter through pipe 36 sucks up liquid from tank 32 and discharges same through pipe 37 at nozzle 38 into the powder-impregnated air being discharged from discharge spout 11. A clutch for pump 35 may be provided if desired although none is shown on the drawing since such apparatus is well known and understood by mechanics, one such having been shown as at 4 connecting the motor to shaft 5.

The operation is as follows:

Lid 31 is removed and powdered material of the desired properties is charged into container 14 as desired and the lid replaced. The motor 2 is started and gate 29 adjusted to provide the desired discharge of powder through port 28 into the chamber below partition 27 from which it is moved by spider 24 and discharged through opening 26 in the bottom of container 14 into intake pipe 13 by which it is conveyed with a current of air through auxiliary fan housing 9, through pipe 15 into fan housing 8 and thence discharged through discharge spout 11 on to the vegetation being treated. It will be noted that opening 26 is spaced oppositely from port 28, which spacing provides that only the powder moved from beneath port 28 by spider 24 to opening 26 will be discharged into intake pipe 13.

Spider 24 and agitator 25 break up any lumps of the powdered material and rotor 12 in auxiliary fan 9 thoroughly diffuses the powder with air before being discharged into the intake side of fan housing 8, thus only finely pulverized material and air is fed into the latter. Operated thus we have provided a very efficient broadcast powder or dusting machine.

It will be noted that we have provided that discharge spout 11 may be rotated about its connection with fan housing 8 as at 39 so as to discharge in any horizontal direction, pipe 37 having been introduced into discharge pipe 11 centrally of the mounting of the latter on housing 8 as at 40, so that the end of pipe 37 carrying diffusing nozzle 38 may be rotated with discharge pipe 11.

Upon starting pump 35 liquid, such as water is drawn up through pipe 36, and discharged through pipe 37 and thoroughly diffused by nozzle 38 into the powder impregnated air being discharged from discharge spout 11. The water commingles with the air and powder and is carried by the pressure of its own discharge and the discharging air and powder onto the vegetation being treated. The powder and water intermix at the point of discharge, in their travel onto the vegetation and loose particles of the powder adhere to the moistened vegetation.

It will be further understood that should it be desired any soluble substance may be mixed with the water in tank 32 or any substance readily carried by the water may be mixed therewith in tank 32 and discharged by pump 35 through pipe 37 and nozzle 38 without reference to powder being discharged from container 14 or air from fan 8 or auxiliary fan 9 and as such we have an efficient spraying machine.

Having described our invention what we claim is:

1. A spraying machine in which a powder is mixed with air, the mixture passed through an auxiliary fan and thence through an exhaust fan to a point of discharge and at said latter point injecting a liquid into the mixture.

2. In a discharging hopper for dusting machines, a partition near the bottom of the hopper, a discharge port in said partition, an opening in the bottom of said hopper, and independent agitating and discharge means located above and below the partition.

3. In a discharging hopper for dusting machines, a partition near the bottom of the hopper, a discharge port in said partition, an opening in the bottom of the hopper spaced not in registry with said port, and independent agitating and discharge means located above and below the partition.

4. In a discharging hopper for dusting machines, a partition near the bottom of the hopper, a discharge port in said partition, an opening in the bottom of the hopper not in registry with said port and means between said partition and the bottom of the hopper for moving powder from a point below said port to said opening.

5. In a discharging hopper for dusting machines, a compartment for containing powder, a second compartment below said first compartment, an opening in the bottom of said second compartment, means for agitating the powder in the first compartment and means in the second compartment for reducing lumps of powder and moving the same to said opening in said second container.

In testimony whereof we affix our signatures.

ARTHUR J. BROWN.
RICHARD R. EZDORF.